March 15, 1932. W. A. STEVENS 1,849,735
MEANS OF CONTROL FOR ELECTRICALLY DRIVEN VEHICLES
Filed June 21, 1927 2 Sheets-Sheet 1
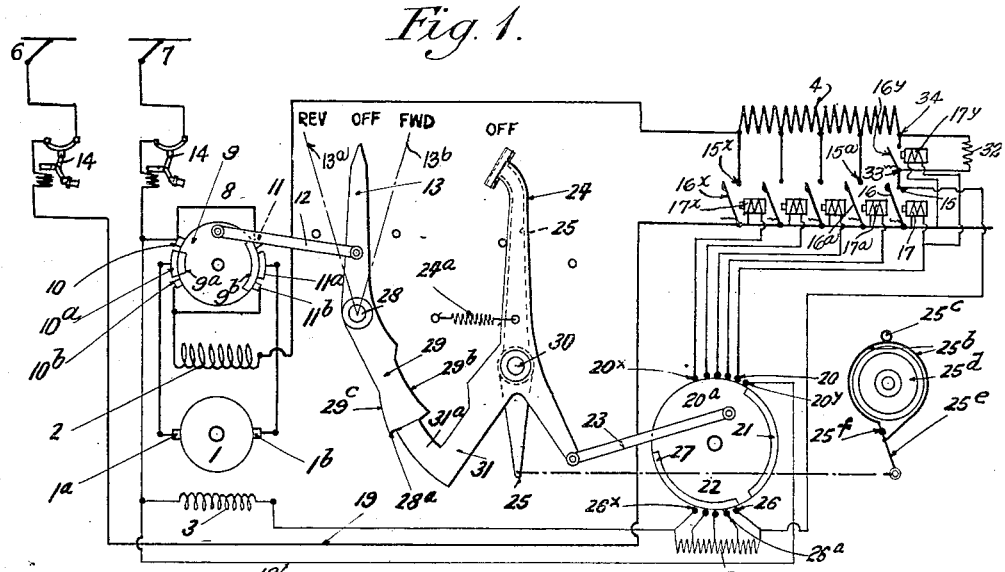
Inventor
William Arthur Stevens
By Dowell and Dowell
Attorneys March 15, 1932. W. A. STEVENS 1,849,735
MEANS OF CONTROL FOR ELECTRICALLY DRIVEN VEHICLES
Filed June 21, 1927    2 Sheets-Sheet 2
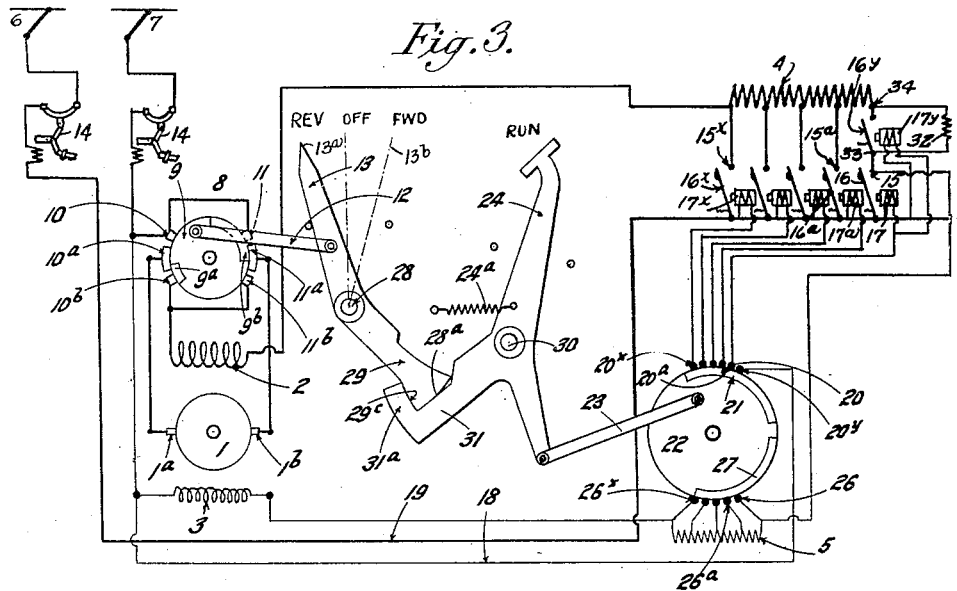
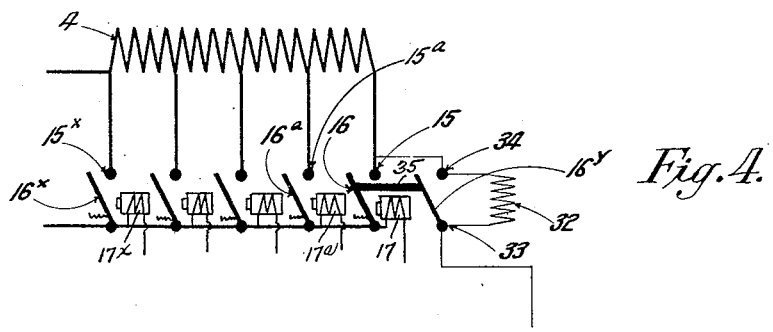
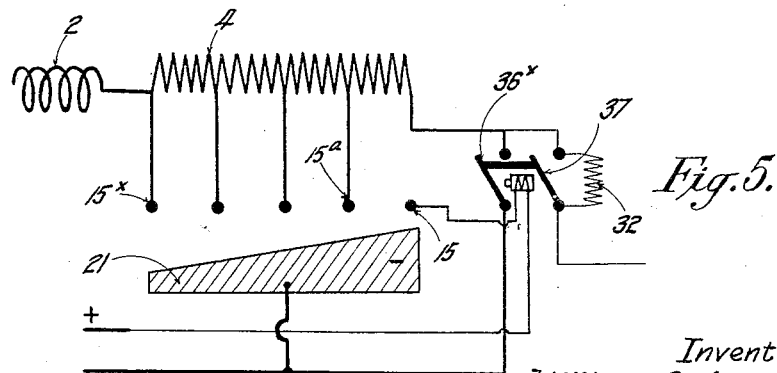
Inventor
William Arthur Stevens
By Dowell and Dowell
Attorneys Patented Mar. 15, 1932

1,849,735

UNITED STATES PATENT OFFICE

WILLIAM ARTHUR STEVENS, OF MAIDSTONE, ENGLAND, ASSIGNOR TO GUY MOTORS LIMITED, OF WOLVERHAMPTON, ENGLAND

MEANS OF CONTROL FOR ELECTRICALLY DRIVEN VEHICLES

Application filed June 21, 1927, Serial No. 200,350, and in Great Britain June 29, 1926.

This invention relates to electrically propelled vehicles of the kind known as trolley vehicles, battery vehicles and petrol electric vehicles, in which the driving motor receives current from overhead trolley wires, or from a battery on the vehicle, or from a dynamo, driven from an internal combustion engine on the vehicle. The invention relates more particularly to such vehicles in which the electric motor is provided with series and shunt field windings, the series winding being in circuit with the armature winding and the shunt winding circuit being connected across the electric supply mains, so that the motor is of the regenerating type, and the said series and shunt windings have in series therewith resistances that can be progressively cut in or out of circuit, to meet the required varying conditions of running of the vehicle by controlling means actuated by a spring controlled pedal lever, the motor being also provided with current reversing switch mechanism.

The invention has for its object to provide in connection with the means used for controlling the working of a motor of the kind referred to, means for preventing the current reversing switch mechanism being operated until the whole of the series resistance has been inserted in circuit with the armature winding and series winding and the circuit broken, in order to prevent sparking during reversal of current direction. It also has for its object to prevent undue rise of voltage at the terminals of the motor when the circuit controlling means is moved into its "off" position and the vehicle is allowed to coast on a hill, or on a level road, at speed.

For attaining the first mentioned object, there is associated with the current reversing switch mechanism and the pedal lever of the circuit controlling means of the motor, pedal locking means whereby the current reversing mechanism will be prevented from being operated until the pedal lever is in its neutral or off position, with the whole of the series resistance in circuit with the series field winding and armature winding, and the circuit broken.

For attaining the secondly mentioned object, there is associated with the shunt winding and its variable resistance, a supplementary resistance that is inoperative whilst current is being supplied to the motor but which is brought automatically into circuit with the shunt resistance to prevent undue rises of voltage at the terminals of the motor when the circuit controlling means is moved into its "off" position and the vehicle is allowed to coast on a hill, or on a level road, at speed.

In the accompanying illustrative drawings, Figs. 1, 2 and 3 show diagrammatically, an electric motor of the kind referred to with its control means, Fig. 1 showing the control means in the neutral position, as when the motor is not in operation, Fig. 2 showing the control means in position for forward running and Fig. 3 showing the control means in reverse position for backward running. Figs. 4 and 5 show modified arrangements.

Referring to Figs. 1, 2 and 3 of these drawings, 1 is the armature of an electric motor, preferably provided with commutator poles, and 2 and 3 the armature field and shunt windings respectively, the winding 2 being in series with the armature winding and the winding 3 being in shunt to the electric supply mains. 4 is a variable resistance for the series winding 2, and 5 a variable resistance for the shunt winding 3, 6 and 7 are the poles of the electric supply mains, which may be an overhead line and earth, or of a battery on the vehicle, or of a motor driven dynamo on the vehicle. 8 represents generally current reversing switch mechanism of any suitable kind, whereby the circuit of the motor can be opened or closed, or the direction of current supply through the armature winding reversed at will. It is hereinafter called for brevity the current reversing switch. In the example shown, it comprises a rotary insulating member 9 carrying metal contact segments $9^a$ and $9^b$, and two sets of stationary contacts, namely 10, $10^a$, $10^b$ and 11, $11^a$, $11^b$. The rotary member 9 is connected by a link 12 to a hand operated lever 13, hereinafter referred to as the reversing lever.

The pole 7 of the electric supply is connected, preferably by way of an automatic circuit breaker 14, to one or other of the brushes $1^a$, $1^b$, of the motor armature 1, say the brush $1^a$, when the current reversing switch is in position for forward running (Fig. 2) and to the brush $1^b$ for reverse running (Fig. 3), and to one end of the shunt winding 3. From the other brush of the armature as the case may be, the circuit is taken through the series winding 2 and then through the variable resistance 4, the contacts 15, $15^a$ . . . $15^x$ of which can successively be closed by means of contactors, 16, $16^a$ . . . $16^x$ the operating windings 17, $17^a$ . . . $17^x$ of which are arranged to be completed across circuit conductors 18 and 19 through stationary contacts 20, $20^a$ . . . $20^x$ by a contact segment 21 on a rotary drum controller 22 arranged to be partly rotated through a link 23 from a pedal lever 24 provided with a returning spring $24^a$. Conductor 18 is connected to a stationary contact $20^y$ with which the contact segment 21 first makes connection when the controller 22 is turned in an anti-clockwise direction from the position shown in Fig. 1. The conductor 19 is connected to the supply pole 6, also preferably through an automatic circuit breaker 14. On the contactor 16 remote from the series field winding 2 being opened, upon movement of the drum controller 22 into the neutral position shown in Fig. 1, the circuit between the poles 6 and 7 of the supply is broken.

The other end of the shunt field winding 3 is connected to the variable resistance 5, the contacts 26, $26^a$ . . . $26^x$ of which are arranged to come successively into contact with a second contact segment 27 on the drum controller 22 when the latter is being moved into the position shown in Fig. 3. The last contact 26 is adapted to be connected to the remote end of the series resistance 4 through a supplementary contactor $16^y$ controlled by a supplementary winding $17^y$.

Breaking the circuit of the operating winding 17 of the remote contactor 16 of the variable series resistance 4, will break the current supply circuit of both the series and shunt windings 2 and 3 respectively.

The brake mechanism of the vehicle is controlled in the ordinary way by a pedal lever 25 arranged at the left hand side of the pedal lever 24 of the control means so that either pedals can be operated at will by the right foot of the driver of the vehicle. The brake mechanism may for example comprise brake shoes $25^b$ hinged at a fixed point $25^c$ and adapted to engage the periphery of a brake drum $25^d$, connected to one of the running wheels of the vehicle, the engagement being effected by operation of a lever $25^e$ pivoted at $25^f$ and connected to the free ends of the shoes and to the brake lever 25.

The variable resistances 4 and 5 are controlled by the pedal lever 24 in the following manner:—

In the normal or "off" position of the reversing lever 13, the pedal lever 24 is held by its spring $24^a$ in the position shown in Fig. 1, the circuit to both series and shunt windings 2 and 3 being broken. Upon moving the reversing lever 13 into its forward position (Fig. 2) or reverse position (Fig. 3) and depressing the pedal lever 24 slightly, the circuit of the operating windings 17 and $17^y$ of the contacts 16 and $16^y$ remote from the series winding 2 will be closed, thus completing the circuit of the series field winding 2 and armature 1, through the resistance 4, and also the circuit of the shunt field winding 3, the shunt resistance 5 being then short circuited by the contact segment 27. The pedal, upon being further depressed, gradually cuts out the series resistance 4, and full field, both series and shunt, is obtained. A further depression of the pedal lever 24 gradually opens the short circuit of the shunt resistance 5, so that when it is fully depressed (see Fig. 2), the current through the shunt field winding 3 is greatly reduced by the shunt resistance 5 then in circuit and full speed of the motor is obtained.

The peripheral length of the contact segments 21 and 27 on the controller drum 22 are such, as shown, that when the contacts 16, $16^a$ . . . $16^x$ controlling the series resistance 4 are fully closed by the contact segment 21, it is possible to continue the movement of the pedal lever 24 and cause the second segment 27 to open the short circuit of the shunt resistance 5 gradually, without breaking the circuit controlled by the first segment 21, the shunt resistance 5 being kept short-circuited only during the first movement of the pedal lever 24.

The operation of driving is controlled entirely by the right foot, by first depressing the pedal lever 24 on the right hand side and starting up the vehicle, the speed variation being controlled by the amount of depression of the foot pedal. For stopping, it will be necessary to remove the foot from the pedal lever 24 and afterwards to operate the brake pedal 25 by the same foot, thus ensuring that the supply circuit to the motor shall be broken by the automatic return of the pedal lever 24 to its normal position (Fig. 1) before the brake is applied.

Reversal of the motor is effected by the reversal of current through the winding of the motor armature 1 by a reversing switch of the ordinary type and such as that hereinbefore described, operated by the lever 13, which corresponds to the change speed lever on a gear driven vehicle. The lever 13 has three positions namely "forward" (Fig. 2), "neutral" (Fig. 1) and "reverse" (Fig. 3), the neutral position being the middle position. When the reversing lever is in the latter position, it will be necessary to ensure that the pedal lever 24 shall be in its "off" position, shown in Fig. 1, before the reversing switch 8 is brought into operation, otherwise heavy sparking at the contacts of the reversing switch 8 will take place. This condition is ensured by an interlocking device which will now be described. To the reversing lever 13, which is mounted to rotate about the axis of a shaft 28, is rigidly connected a catch plate 29 having an outer arc $28^a$ subtending a small angle. To the pedal lever 24, which is mounted to turn about the axis of a shaft 30, is rigidly connected a locking arm 31 the outer end of which is provided with a curved extension $31^a$ adapted to move along each side $29^b$, $29^c$ of the catch plate 29 (Figs. 2–3). The arrangement is such that the reversing lever 13 cannot be moved from its forward running position (Fig. 2) or from its reverse running position (Fig. 3), to its middle position (Fig. 1) until after the pedal lever 24 has been relieved of foot pressure and has been returned by its spring $24^a$ into its normal or "off" position (Fig. 1) in which the end of the extension $31^a$ of the locking arm 31, bears against the end of the locking plate 29, the reversing lever 13 and reversing switch 8 being then free to be operated. In this way it is ensured that the reversing switch cannot be operated unless the pedal lever 24 is in its normal or "off" position (Fig. 1), thus preventing sparking at the contacts of the reversing switch. When the reversing lever 13 is either in the "forward" position (Fig. 2), or in the reverse position (Fig. 3), the catch plate 29 will be out of the way of the locking arm 31 connected to the pedal lever 24, which will then be free for driving purposes. Furthermore, the relative arrangement of the catch plate 29 and locking arm 31 is such that when the reversing lever is in its forward position (Fig. 2), the pedal lever is free to be depressed to its full extent to short circuit the whole of the series resistance 4 of the series field winding 2 and include the whole of the shunt resistance 5 in the circuit of the shunt field winding 3, and that when the catch plate 29 is in its reverse position (Fig. 3), it will enable the pedal lever 24 to be depressed only to a sufficient extent to short circuit the series resistance 4 but not to include any of the shunt resistance 5 in circuit with the shunt field winding 3. In this way the shunt field winding 3 will keep the field of the motor well excited both when more or less of the series resistance 4 is included in circuit with the armature and series field windings and when the series resistance 4 is short circuited, thus ensuring slow reverse running even with a minimum of the series resistance 4 in circuit.

When a high voltage supply to an electric motor having a series starting resistance 4 controlled by contactors 16, $16^a$ . . . $16^x$ as hereinbefore described is used, it has been usual to connect the end of the series resistance 4 remote from the series winding 2 to the supply conductor 19 through two contactors 16 and $16^y$ in series, as hereinbefore described, the magnet windings 17 and $17^y$ of these contactors being connected in parallel and excited by the contact segment 21 of the control drum 22, so that both switches or contactors 16, $16^y$ have to close before the connection from the supply conductor 19 to the remote end of series resistance 4 is made. Instead of connecting the outer or remote end of the adjustable shunt resistance 5 to the outer end of the series resistance 4, as heretofore, it is connected, according to the present invention, to the contact 15 against which the contactor 16 is first caused to bear and which is connected to the contactor $16^y$, and a suitable high resistance 32 hereinbefore referred to as the supplementary resistance is connected across the terminals 33 and 34 of the contactor $16^y$, the terminal 34 of this contactor being connected to the outer or remote end of the series resistance 4.

To start the vehicle, say in the forward direction, the reversing switch lever 13 is moved into the forward position shown in Fig. 2 and the pedal lever 25 and controller 22 are gradually moved into the forward or "on" position, also shown in Fig. 2, so as gradually to bring the contactors 16, $16^y$, $16^a$, $16^x$, into action to close the circuit of the armature 1 and its series field winding 2 and variable resistance 4, and also to close the circuit of the shunt field winding 3, between the poles 6 and 7 of the electric supply and at the same time gradually short circuit the successive sections of the variable resistance 4, and bring the successive sections of the shunt resistance 5 into circuit with the shunt field winding 3. After starting, the speed of the vehicle can be varied to suit requirement by adjustment of the position of the pedal lever 25 and controller 22 so as to vary the amount of the shunt resistance 5 inserted in series with the shunt winding 3 and therefore the strength of the field produced by such winding, in a manner well understood. At this time the supplementary resistance 32 will be short circuited by the contactor $16^y$.

If when the vehicle is travelling down hill at speed, with a weak field such for instance as would be the case with the pedal 25 and controller 22 in the position shown in Fig. 2, in which all the shunt resistances 5 is in series with the shunt field winding 3, the pedal lever 25 and controller 22 be moved back sufficiently only to cause the segment 27 of the controller to short circuit the variable resistance 5, the potential across the armature brushes $1^a$, $1^b$ may exceed that across the positive and negative supply conductors 6 and 7 and the motor will then become a generator and deliver current to the supply conductors 6 and 7. The speed of the vehicle will then be retarded by reason of the motor acting as a generator, and the use of the mechanical brake on the hill will not be necessary. When the motor thus becomes a generator, the current through the series field winding 2 will be reversed and will then act to weaken the magnetism induced in the field magnet of the motor by the shunt field 3. This weakening of the field will act to "cushion" the retarding effect on the speed of the vehicle, when the reverse shunt current is suddenly increased, so that the check on the speed of the vehicle will be gentle, but effective, and a steady current will be returned to line all the time the vehicle is travelling down the hill at high speed.

In addition to its restraining effect on the vehicle on down gradients, regeneration with its accompanying braking effect, can take place on level roads when the vehicle is travelling at speed and the shunt field is suddenly increased.

If when the vehicle is travelling down hill, or on a level road, at speed, the pedal lever 25 and controller 22 be returned to the "off" position, the contactor 16$^y$ will move automatically into its inoperative open position and open the short circuit of the supplementary resistance 32 so that this resistance will be brought into effective circuit with the series and shunt field windings 2 and 3 and thereby weaken the motor field strength to such an extent as to enable the vehicle to coast at a high speed without generating excessive voltage.

If when the vehicle is travelling at high speed on a hill, or on a level road, with the controller in the "on" position, the connection to the supply conductors 6 and 7 be broken, as by one of the trolley wheels leaving its overhead conductor, the driver of the vehicle, who would immediately become audibly aware of what had happened to the trolley wheel, would operate the brake lever 24 to apply the mechanical brake to at once arrest the vehicle in order to prevent the displaced trolley wheel damaging any portion of the overhead conductor system, for instance supporting wires or cross conductors. The same action would take place if one of the automatic circuit-breakers 14 should automatically open, but in this case the driver would at once reclose the circuit breaker.

The contactor switch 16$^y$ for short circuiting and open circuiting the supplementary resistance 32 instead of being controlled by a winding 17$^y$ as described, may, as shown in Fig. 4, be connected by a link 35 of insulating material to the remote contactor 16 so as to be operated thereby in the desired manner.

Instead of connecting the sections of the resistance 4 to the stationary contacts 20, 20$^a$ ... 20$^x$ through electro-magnetically operated contactors 16, 16$^a$ ... 16$^x$, as hereinbefore described, they may be connected direct to the said stationary contacts, as is sometimes done. In this case the remote contact 15 with which the contact segment 21 first comes into contact, will, as shown in Fig. 5, close the winding 36 of an electro-magnetic device of a contactor 36$^x$ across the poles of the electric supply conductors and cause the contactor 36$^x$ to connect the remote end of the series resistance 4 to the same pole as that to which the segment 21 is connected. The contactor 36$^x$ at the same time operates a contactor 37 that normally short circuits the supplementary resistance 32 which is connected at one end to the shunt resistance 5 and at the other end to the remote end of the series resistance 4. When the contact segment 21 is returned to its "off" position, the contactor 36$^x$ opens and moves the contactor 37 into its open position thus bringing the supplementary resistance 32 into use to reduce the current in the shunt winding 3 of the motor.

The variable series resistance 4 and variable shunt resistance 5, are, for the sake of brevity and clearness, respectively referred to in the appended claims as a starting resistance and a field resistance.

What I claim is:—

1. In an electrically propelled vehicle, an electric motor having series and shunt field windings, a starting resistance and a field resistance, current supply conductors, a current reversing switch for said motor, a circuit controller for opening and closing and controlling the connection between said windings and resistances and said supply conductors, and a pedal lever for moving said circuit controller into its running position and into its "off" position, said lever having a neutral or "off" position and starting and running positions, movable interlocking means between said current reversing switch and said pedal lever and adapted to control the movement of said current reversing switch, a supplementary resistance connected to the said starting and field resistances, a short circuiting device for said supplementary resistance and an electro-magnetic device adapted to move said short circuiting device into its short circuiting position when said circuit controller is moved into its running position, and to move it into its open or inoperative position, wherever the circuit controller is moved into its "off" position.

2. In an electrically propelled vehicle, the combination with an electric motor, a current reversing switch and a circuit controller for said motor, of a reversing lever connected to said reversing switch and having a neutral or "off" position and forward and backward running positions and a pedal lever connected to said circuit controller and having a neutral or "off" position and starting and running positions, a catch plate rigidly connected to said reversing lever and a locking arm rigidly connected to said pedal lever, said catch plate and locking arm being so relatively shaped and arranged that said catch plate and reversing lever cannot be moved until said pedal lever is in its neutral or "off" position, and that when said catch plate has been moved into position for forward running or backward running of the motor, said locking arm and pedal lever can be moved in the same direction from the neutral position but to different angular extents.

3. In an electrically driven vehicle, the combination with a motor, a controller therefor, a current reversing switch and a pedal lever for operating the controller, of mechanical means adapted when the reversing switch is moved from the neutral to one running position, to permit of the controller pedal being moved from neutral position to a certain angular extent, and similarly when the reversing switch is moved from its neutral position to an opposite running position, to permit of the controller pedal being moved from its neutral position in the same angular direction as before but to a greater extent.

4. In an electrically propelled vehicle, the combination with an electric motor having series and shunt field windings, a starting resistance and a field resistance, of a current reversing switch, a plurality of stationary contacts connected to different points of the starting resistance, a plurality of stationary contacts connected to different points of the field resistance, a rotary carrier and two insulated rotary contact segments carried by said rotary carrier and adapted to co-act with said stationary contacts, a pedal lever having a neutral or "off" position and starting and running positions and adapted to rotate said carrier, and an interlocking device arranged to be operated by said pedal lever and adapted to limit the rotation of said carrier when said reversing switch is in one running position.

5. In an electrically propelled vehicle, the combination with an electric motor having series and shunt field windings, a starting resistance, a field resistance and current supply conductors, of a supplementary resistance and a circuit controller adapted, when moved into its "on" position, to connect the motor to the supply conductors, to put the supplementary resistance out of action, to short circuit the starting resistance and to bring the field resistance into effective circuit with the shunt field winding, and when moved into its "off" position, to disconnect the motor from said supply conductors and bring the supplementary resistance into circuit with the starting resistance and shunt field winding.

6. In an electrically propelled vehicle, the combination with an electric motor having series and shunt field windings, a starting resistance, a field resistance, and current supply conductors, of a supplementary resistance connecting the said starting and field resistances, a short circuiting device for said supplementary resistance, electromagnetic means adapted, when energized, to cause said short circuiting device to short circuit said supplementary resistance and when de-energized to remove the short circuit from the supplementary resistance and leave the latter in effective circuit with the starting resistance and the shunt field winding and a circuit controller adapted when moved into its "on" position, to close the circuit between said supply conductors and thereby energize said electro-magnetic device, to short circuit the starting resistance and to insert the field resistance in series with the shunt field winding, and when moved into its "off" position, to short circuit the field resistance, to insert the starting resistance, in series with the series field winding and to open the circuit between the supply conductors and thereby de-energize the said electro-magnetic means.

Signed at London, England, this ninth day of June, 1927.

WILLIAM ARTHUR STEVENS.